R. E. ELLIS.
CHUCK FOR MACHINE TOOLS.
APPLICATION FILED DEC. 20, 1917.

1,400,272.

Patented Dec. 13, 1921.
2 SHEETS—SHEET 1.

Witness:
C. Dunap

Inventor:
Russell E. Ellis
By Sheridan, Sheridan & Smith, Att'ys

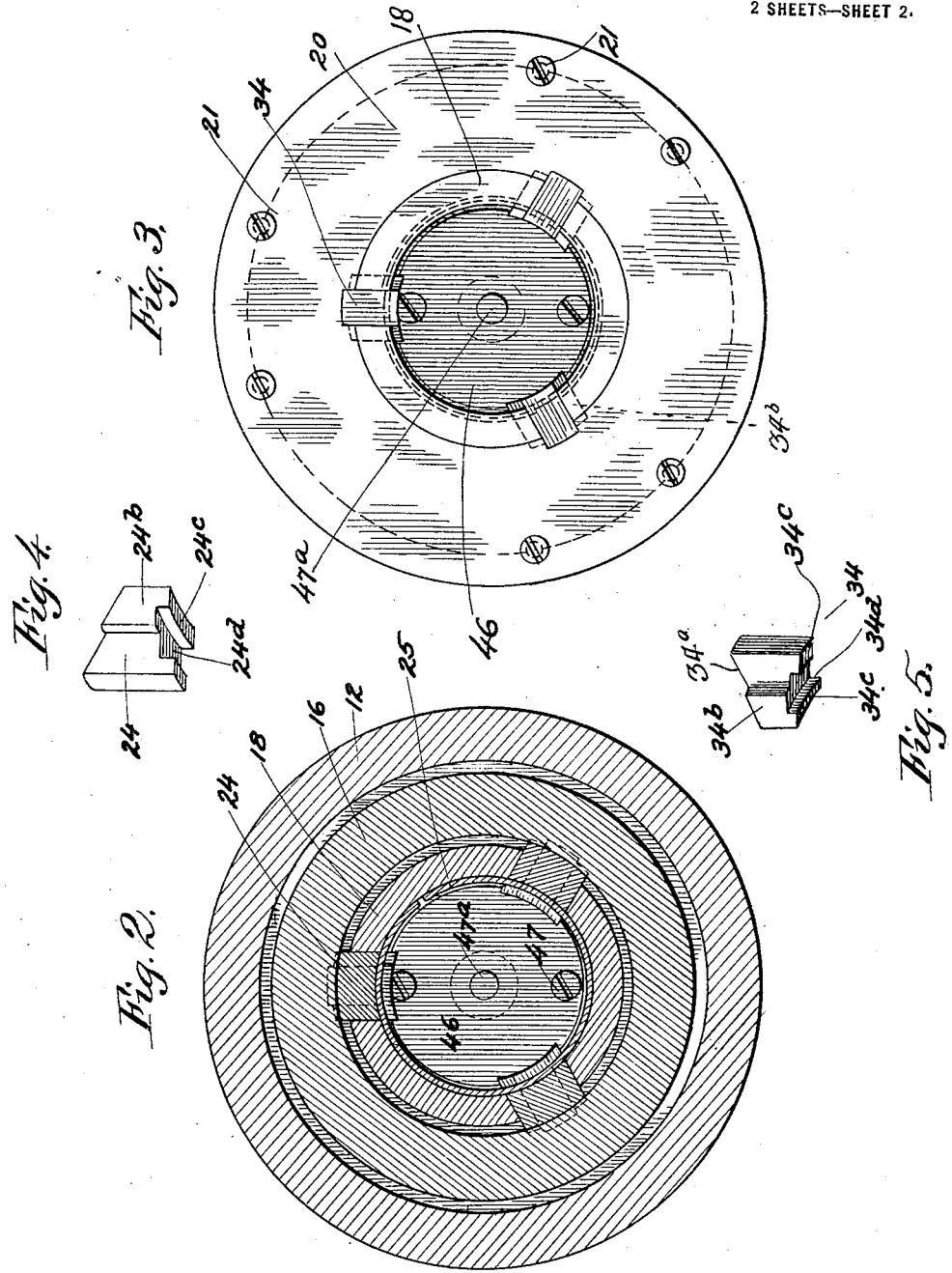

UNITED STATES PATENT OFFICE.

RUSSELL E. ELLIS, OF CHICAGO, ILLINOIS, ASSIGNOR TO HANNIFIN MANUFACTURING COMPANY, OF CHICAGO, ILLINOIS, A CORPORATION OF ILLINOIS.

CHUCK FOR MACHINE-TOOLS.

1,400,272.        Specification of Letters Patent.      Patented Dec. 13, 1921.

Application filed December 20, 1917. Serial No. 208,013.

*To all whom it may concern:*

Be it known that I, RUSSELL E. ELLIS, a citizen of the United States, residing at Chicago, in the county of Cook and State of Illinois, have invented certain new and useful Improvements in Chucks for Machine-Tools, of which the following is a specification.

This invention relates to chucks for machine tools, and its purpose is to provide an improved self-centering chuck for positioning and centering the stock and maintaining the axis thereof coincident with the axis of rotation of the chuck.

The principal object of the invention is to improve upon chucks of the radial jaw type and of the Collet type by combining the advantages of those forms of mechanism with other features in the form of a new and improved chuck. Chucks of the radial jaw type are not adapted to hold the work firmly, especially if the same is of considerable length, and they do not insure an accurate alinement of the piece with the axis of the chuck; chucks of the Collet type permit a reasonably accurate alinement, but do not insure a gripping of the piece at widely separated points longitudinally thereof, nor provide a sufficient gripping pressure for the work to be performed.

The disadvantages of previous forms of chucks are overcome in the present invention by the provision of means for automatically and accurately centering and alining the piece with the axis of the chuck, so that pieces of various lengths are gripped firmly by one or more sets of jaws having preferably a radial movement. A further object of the present invention is to provide a chuck of the kind referred to which will accommodate pieces of widely varying diameters. A further feature of the invention is that it allows for variation in the cross-section of the piece to be gripped and insures a firm holding thereof, regardless of such variations. Still another feature of the invention is the provision of means for automatically and accurately positioning the piece in the chuck longitudinally of the axis thereof. Other objects relate to various features of construction and arrangement which will appear more fully hereinafter.

The nature of the invention will be understood from the following specification, taken in connection with the accompanying drawings, in which one embodiment of the invention is illustrated.

In the drawings—

Fig. 2 shows a sectional view taken on the line 2—2 of Fig. 1, looking in the direction of the arrows;

Fig. 3 is an end elevation of the chuck looking toward the left, as viewed in Fig. 1;

Fig. 4 is a perspective view of one of the jaws of the inner set illustrated in Fig. 2; and Fig. 5 is a perspective view of one of the jaws of the outer set shown in Fig. 3.

Figure 1:
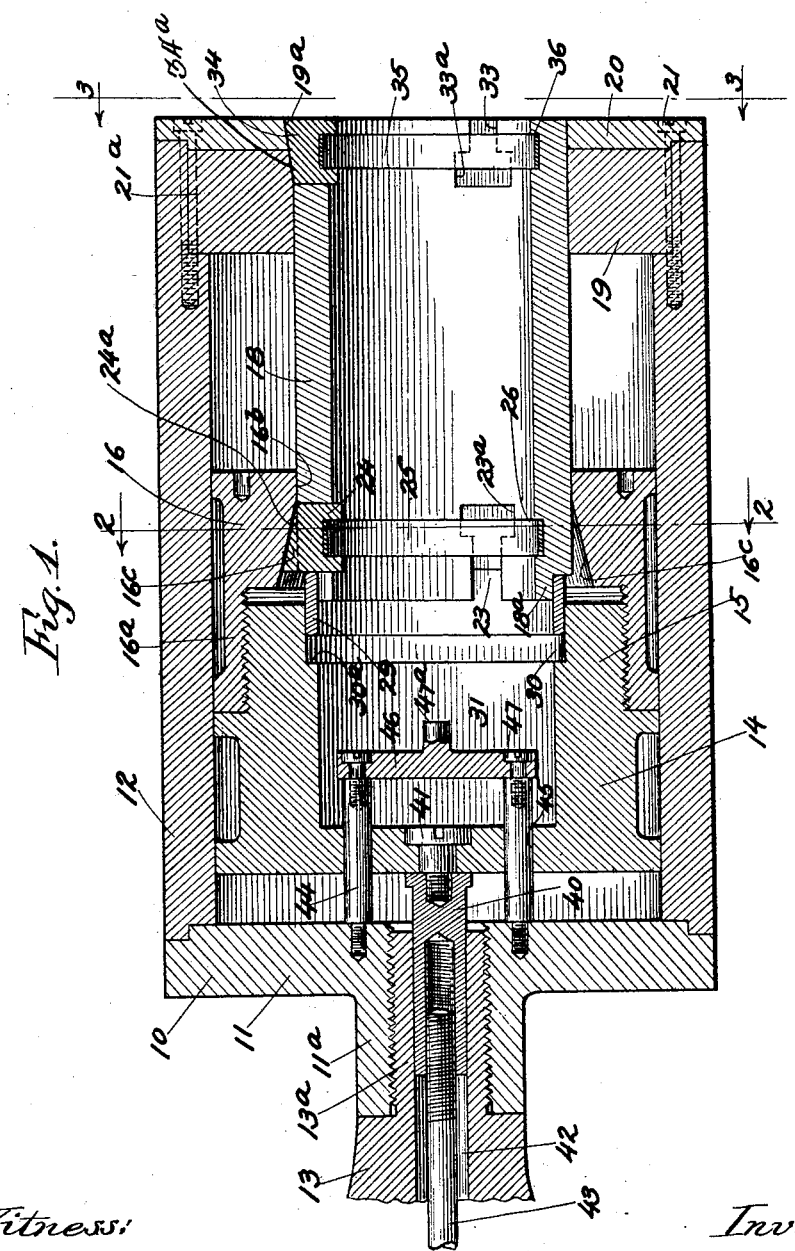
Figure 1 shows a longitudinal sectional view through one form of my invention comprising two sets of jaws operated from the axis of the chuck.

In the accompanying drawings the body 10 of the chuck is shown as comprising an end plate 11 secured to or formed with a cylindrical portion 12. The plate 11 and the hub or sleeve 11$^a$ carried thereby are provided with an internally threaded aperture adapted to form a threaded engagement with the end portion 13$^a$ of the rotatable spindle 13 forming a part of the lathe, or other machine tool with which the chuck is used. A cylindrical cup or head 14 is slidably mounted in the cylindrical bore of the part 12 of the body of the chuck, and the end portion 15 thereof, having a reduced diameter, is threaded on its outer surface to engage the threaded annular extension 16$^a$ of the jaw-actuating member 16, constructed in the form of a ring or annular band adapted to receive the jaw-carrying sleeve 18, which closely fits and slides within the cylindrical bore 16$^b$ of the ring 16. The sleeve 18 is also slidably mounted within the cylindrical bore of the outer or fixed jaw-actuating ring 19, which is mounted in the counter bored outer extremity of the body of the chuck and retained in place by the face-plate 20, having cap screws 21 extending therethrough and into suitable apertures in the body of the chuck. The cap screws 21 engage notches 21$^a$ around the periphery of the ring 19, so that this ring is held against relative rotation with respect to the body of the chuck.

The jaw-carrying sleeve 18 is provided at its inner end with a plurality of radial T-shaped jaw-receiving slots 23, which extend inwardly from the end of the sleeve and carry the gripping jaws 24, having sliding movements radially. These jaws are of the form illustrated particularly in Fig. 4, and are provided on their outer sides with inclined surfaces 24ª adapted to coact with similarly inclined surfaces 16ᶜ formed on the inner annular surface of the member 16. The jaws 24 are provided with shoulders 24ᵇ, which engage the arm portions 23ª of the T-shaped slots 23, and the inner arcuate gripping surfaces 24ᶜ of the jaws are provided with transverse grooves or recesses 24ᵈ adapted to receive a band-spring 25, which lies in an annular groove 26 formed in the inner face of the sleeve 18. This band spring normally presses the jaws outwardly in the slots 23 against the jaw-actuating ring 16, but upon relative movement of the member 16 with respect to the jaw-carrying member 18 the jaws are forced inwardly by the inclined surfaces on the jaw-actuating member. In order to prevent dust or other foreign materials from coming in contact with the working surfaces of the jaw-actuating member a dust sleeve or band 29 is mounted on the reduced extremity 18ª of the sleeve 18, and arranged to have a sliding engagement with the counterboard portion 30 of the cup or recess 31, which is formed within the member 14. The end of the member 29 is adapted to abut against the annular shoulder 30ª at the end of the counterbore to limit the relative movement of the member 18 with respect to the member 14.

At the outer end of the chuck the sleeve 18 is provided with a plurality of T-shaped slots 33 adapted to receive another set of gripping jaws 34, provided on their outer sides with inclined surfaces 34ª to coact with similarly inclined surfaces 19ª formed on the ring 19 and the face-plate 20. The shoulders 34ᵇ of the jaws 34 engage the wing portions 33ª of the slots 33, so that relative longitudinal displacement of the jaws with respect to the sleeve 18 is prevented, while the jaws have free slidable movements in radial directions. The inner curved gripping surfaces 34ᶜ of the jaws are provided with grooves 34ᵈ to receive the band-spring 35, which rests in a groove 36 formed in the inner surface of the sleeve 18. The band spring normally presses the jaws 34 outwardly against the inclined surfaces 19ª, but upon relative movement of the sleeve 18 with respect to the ring 19 the jaws are moved inwardly by the action of the inclined surfaces, and caused to grip the stock placed within the chuck.

The slidably mounted head 14 is actuated by a stem 40 which is connected thereto by a screw 41, and which is slidably mounted in the bore 42 of the spindle 13. An actuating rod 43 is operatively connected to the stem 40 at one end, and is connected in any desired manner at the other end to suitable actuating mechanism, such as a compressed air cylinder, or the like, by means of which a reciprocatory movement may be imparted to the stem 40 and the member 14 connected therewith.

The head 14 is held against rotation with respect to the body of the chuck by means of the guide pins 44, which are secured to the end plate 11 of the chuck body and passed through suitable apertures 45 in the head. These guide pins also carry a stop plate 46, which is secured thereto by the screws 47, and which carries at its middle point the stop lug 47ª, adapted to coact with the work which is inserted into the bore of the chuck. It will be apparent that the pins 44 may serve as stops, if desired, without using the plate 46.

In the operation of the invention, the piece to be operated upon is first inserted in the chuck as far as the stop will permit, and then the chuck-actuating means is operated to move the rod 43 to the left, as viewed in Fig. 1, whereupon the actuating ring 16 pushes the jaws 24 toward the piece. As soon as the friction between the jaws 24 and the piece becomes greater than that between the jaws 24 and 34 and the rings 16 and 19, respectively, further movement of the rod 43 will cause the ring 16 to carry with it the sleeve 18 and the piece, so that the piece is automatically positioned against the stop 46, in case the piece is not already in proper position, and at the same time the movement of the sleeve 18 presses the outer jaws 34 against the inclined surfaces 19ª of the ring 19, and thereby moves the outer jaws into engagement with the piece. In this way both the inner and outer jaws are caused to grip the piece firmly, and at the same time the piece is moved longitudinally and positioned against the stop. Any inaccuracy in the initial loigitudinal position of the pece is thus automatically compensated for, and at the same time the piece is gripped firmly at a plurality of widely separated points longitudinally. When the piece is already positioned against the stop, when the jaws 24 engage it, these jaws may slide somewhat upon the piece to permit the longitudinal movement of the sleeve 18, whereby the outer set of jaws is actuated.

When releasing the piece from the chuck, the rod 43 is moved in the opposite direction, thus causing a relative longitudinal movement of the band 16 and the sleeve 18, whereupon the band spring 25 forces the jaws 24 outwardly and causes the inner end of the piece to be released. When the shoulder 30ª of the member 14 engages the end of the sleeve 29 carried by the member 18, the member 18 will be moved longitudinally with the member 14, thereby permitting the jaws 34 to move outwardly under the influence of the band spring 35. The forward motion of the sleeve 18 is limited by the shoulders 34$^b$ of the jaws 34 striking the face plate 20. By the construction just described, it will be apparent that both jaws are operated in succession by the operation of a single member. By changing the inclination of the actuating surfaces it will be apparent that the jaws may be caused to move inwardly by a push of the member 43, instead of by pulling the same.

If the slopes or inclinations of the outer surfaces of both sets of jaws were the same the inner set of jaws might tend to remain in contact with the piece after the outer jaws had arrived at the ends of their receding strokes in cases where the surfaces of the piece are very rough, and there would then be sufficient friction between the inner jaws and the piece to prevent the removal of the piece from the chuck without additional effort. In order to insure the release of the piece by the inner jaws, these jaws preferably have a greater slope than those at the outer end of the chuck, thus causing the former to recede from the piece with greater speed than the latter. This difference in the inclination not only permits a free removal of the piece from the chuck after completion of the machining operations, but the radial component of the force exerted upon each jaw of the outer set is greater than the radial component of the force exerted upon each jaw of the inner set, so that the piece is held more firmly at the outer end of the chuck where the transverse pressure thereon is greatest. This construction has the further advantage that the inner set of jaws may slip to some extent upon the piece after the same has been positioned longitudinally, in order to permit the outer set of jaws to move to gripping position.

Since the stroke of each set of jaws is dependent only upon the cross section of the piece to be gripped thereby, and is not influenced by the stroke of the other set of jaws, it is apparent that any irregularity of cross section of the piece is compensated for, and each set of jaws will firmly grip this particular cross section of the piece, whether the piece be finished or a rough forging or casting in which irregularities cannot be avoided. The jaw-actuating rings 16 and 19 are concentric with the axis of the body of the chuck, and since the radial movement of each jaw of the same set is therefore the same, it follows that each cross section of the piece is gripped concentrically with the sleeve 18, and held with its axis coincident with the longitudinal axis of the chuck. The perfect alinement of the piece in the chuck is thus insured, in addition to the positioning of the pieces longitudinally in the chuck, so that pieces of relatively great length may be machined at one end and then reversed in position in the chuck, which will permit operations upon the other end, and the end portions of the resulting product are in exact alinement with each other. The radial length of the jaws may be varied as desired to accommodate pieces of various cross sections, and by varying the length of the jaw-holding sleeve 18, and the distance between the sets of jaws, the chuck may be used with equal advantage on pieces of greatly varying length. A further advantage of the construction is that the perfect centering and alinement of the piece under all circumstances make it unnecessary to provide any surplus material on the rough piece to compensate for inaccuracies in the chucking of the same, it being necessary merely to provide sufficient surplus material to give the piece the desired finished surface. A saving in material is thus accomplished, and also a saving in labor, since it is unnecessary with the present invention to make a preliminary finish on one part of the piece in order to permit the same to be gripped coaxially in the chuck. All of the various parts of the chuck may be readily disassembled for purposes of cleaning and repairing.

Athough I have shown and described a certain embodiment of the invention for purposes of illustration, it will be understood that it may be constructed in widely different forms without departing from the scope of the invention as defined in the appended claims.

What I claim is:—

1. The combination in apparatus of the class described, of a hollow body, a tubular jaw holder slidably mounted in said body, radially movable jaws slidably mounted in said jaw holder, an abutment and means for effecting an inward movement of said jaws to grip the work and a simultaneous longitudinal movement of said jaw holder to position said work against said abutment.

2. The combination in apparatus of the class described, of a rotatable spindle, a hollow body detachably mounted on said spindle, a tubular jaw holder slidably mounted in said body, radially movable jaws mounted in said jaw holder, means for causing a radial movement of said jaws and a longitudinal movement of said jaw holder after said jaws have gripped the work, and a stop mounted within said body to engage the end of the work upon longitudinal movement of said jaw holder.

3. The combination in apparatus of the class described, of a rotatable spindle, a hollow body detachably mounted on said spindle, a tubular jaw holder slidably mounted in said body, radially movable jaws mounted in said jaw holder, a jaw actuating member, and mechanically actuated means for causing a longitudinal movement of said jaw actuating member to effect the actuation of said jaws.

4. The combination in apparatus of the class described, of a rotatable spindle, a hollow body rigidly attached to said spindle, a jaw holder mounted in said body, radially slidable jaws mounted in said jaw holder, said jaws having outer inclined surfaces, a jaw actuating member extending around said jaw holder and having an annular inclined surface to coact with the inclined surfaces of said jaws, a slidably mounted head connected to said jaw actuating member, and means operated from the exterior of said body for reciprocating said head.

5. The combination in apparatus of the class described, of a rotatable spindle, a hollow body carried by said spindle, a jaw holder mounted in said body, radially slidable jaws mounted in said jaw holder, said jaws having outer inclined surfaces, a jaw actuating member extending around said jaw holder and having an annular inclined surface to coact with the inclined surfaces of said jaws, a slidably mounted head connected to said jaw actuating member, means to reciprocate said head, and a stop mounted within said head to engage the work held by said jaws.

6. The combination in a device of the class described, of longitudinally movable jaw-holding means, separate sets of radially movable jaws carried by said jaw-holding means, means for effecting an independent radial movement of the jaws of one set and for moving said jaw-holding means longitudinally, and means actuated by the longitudinal movement of said jaw-holding means for effecting radial movement of the other set of jaws.

7. The combination in a device of the class described, of longitudinally movable jaw-holding means, separate sets of radially movable jaws carried by said jaw-holding means, said sets of jaws being spaced apart longitudinally, means for effecting an independent radial movement for the jaws of one set, and means actuated by the longitudinal movement of said jaw-holding means for moving the other set of jaws radially.

8. The combination in apparatus of the class described, of a spindle, a body portion carried by said spindle, a longitudinally movable jaw holder mounted in said body portion, two sets of jaws slidably mounted in said jaw holder, independent jaw actuating members for each set of jaws, and means for causing longitudinal movement of one of said jaw actuating members and of said jaw holder, the longitudinal movement of the latter rendering the other of said members operative.

9. The combination in a device of the class described, of a body portion, jaw carrying means slidably mounted in said body portion, radially slidable jaws mounted in said jaw carrying means, a head slidably mounted in said body portion, and a jaw actuating member connected to said head and engaging said jaws.

10. The combination in a device of the class described of a body portion, a head slidably and non-rotatively mounted in said body portion, slidably mounted jaw-carrying means, a plurality of radially movable jaws mounted in said jaw-carrying means, an actuating member carried by said head and coacting with said jaws to operate the latter and said jaw-carrying means, means for reciprocating said head, and a stop mounted within said body portion to limit the axial movement of the piece upon longitudinal movement of said head.

11. The combination in apparatus of the class described, of a hollow body, a tubular jaw holder mounted in said body, radially slidable jaws mounted in opposite ends of said jaw holder, said jaws having inclined surfaces, annular jaw actuating members surrounding said jaw holder and having inclined surfaces to coact with the inclined surfaces of said jaws, and means for causing longitudinal movement of one of said jaw actuating members and for causing longitudinal movement of said jaw holder after the work has been gripped by one set of jaws.

12. The combination in a device of the class described, of longitudinally movable jaw-holding means, separate sets of radially movable jaws mounted in said jaw-holding means, separate jaw-actuating devices for each set of jaws, means actuated by the movement of one of said actuating devices with respect to said jaw-holding means for actuating one set of jaws, and means actuated by the movement of the jaw-holding means thereafter with respect to the other jaw-actuating device for actuating the other set of jaws.

13. The combination in a device of the class described, of longitudinally movable jaw-holding means, separate sets of radially movable jaws mounted in said jaw-holding means, a movable jaw-actuating device for one set of jaws, a fixed jaw-actuating device for the other set of jaws, and means for moving said movable device with respect to said jaw-holding means for actuating one set of jaws and for moving said jaw-holding means with respect to said fixed jaw-actuating device for actuating the other set of jaws.

14. The combination in a device of the class described, of a jaw holder, a plurality of radially movable jaws mounted in said jaw holder, said jaws having inclined surfaces, a member having an annular inclined surface to coact with the inclined surfaces of said jaws, means for moving said member longitudinally of said jaw holder to effect a radial movement of said jaws by the coaction of said inclined surfaces, and a stop, said jaw holder being movable with said member after said jaws have engaged the piece, whereby the piece is moved longitudinally against said stop.

15. The combination in apparatus of the class described, of a jaw holder, separate sets of radially movable jaws mounted in said jaw holder, the jaws of each set having similarly inclined tapered surfaces, separate members each having inclined tapered surfaces to coact with the inclined surfaces of one set of jaws, one of said members being fixed and the other movable, and means for moving said movable member with respect to said jaw holder to actuate one set of jaws and for moving said jaw holder with respect to said fixed member for actuating the other set of jaws.

16. The combination in apparatus of the class described, of a jaw holder, separate sets of radially movable jaws mounted in said jaw holder, the jaws of each set having similarly inclined tapered surfaces, separate members each having inclined tapered surfaces to co-act with the inclined surfaces of one set of jaws, one of said members being fixed and the other movable, means for moving said movable member with respect to said jaw holder to actuate one set of jaws and for moving said jaw holder with respect to said fixed member for actuating the other set of jaws, and means to effect the release of said jaws when said movable member and said jaw holder are moved in the other direction.

17. The combination in apparatus of the class described, of a jaw holder, separate sets of radially movable jaws mounted in said jaw holder, the jaws of each set having similarly inclined tapered surfaces, separate members each having inclined tapered surfaces to co-act with the inclined surfaces of one set of jaws, one of said members being fixed and the other movable, means for moving said movable member with respect to said jaw holder to actuate one set of jaws and for moving said jaw holder with respect to said fixed member for actuating the other set of jaws, and resilient means normally opposing the action of said movable member and said fixed member, whereby the reverse movement of said movable member and of said jaw holder effects the release of said jaws.

18. The combination in apparatus of the class described, of a hollow body, an abutment, a tubular jaw holder slidably mounted in said body, radially movable jaws slidably mounted in said jaw holder, and means for effecting an inward movement of said jaws and a longitudinal movement of said jaw holder, the latter movement serving to position said work against said abutment.

19. The combination in apparatus of the class described, of a hollow body, a tubular jaw holder slidably mounted in said body, radially movable jaws slidably mounted in said jaw holder, and means for effecting an inward movement of said jaws and a simultaneous longitudinal movement of said jaw holder inwardly of said body, said means being operable in a reverse direction to release said jaws and to move said jaw holder outwardly.

In testimony whereof I have subscribed my name.

RUSSELL E. ELLIS.

Witnesses:
 LOUIS REISFELD,
 JOHN A. SWATIK.